United States Patent [19]
Borgford

[11] 3,914,486
[45] Oct. 21, 1975

[54] SHEAR FORM STRUCTURES

[76] Inventor: Skapti Josef Borgford, 1292 Valour Road, Winnipeg, Manitoba, Canada

[22] Filed: Mar. 15, 1974

[21] Appl. No.: 451,578

[30] Foreign Application Priority Data
Mar. 27, 1973 Canada.............................. 167540

[52] U.S. Cl. .................. 428/73; 52/615; 428/116; 428/178
[51] Int. Cl.² .......................................... B32B 3/12
[58] Field of Search ........... 46/24; 161/68, 69, 127, 161/131, 136; 217/26.5; 229/2.5; 14/14; 52/594, 615, 618; 29/455 LM

[56] References Cited
UNITED STATES PATENTS

| | | | |
|---|---|---|---|
| 2,024,001 | 12/1935 | Hamilton .............................. | 14/14 |
| 2,481,046 | 9/1949 | Scurlock ........................... | 161/131 X |
| 2,720,948 | 10/1955 | Pajak ................................ | 161/68 X |
| 3,086,899 | 4/1963 | Smith et al........................ | 161/127 |
| 3,193,434 | 7/1965 | Weiss................................. | 161/69 X |
| 3,227,598 | 1/1966 | Robb ................................. | 161/68 |
| 3,301,732 | 1/1967 | Kunz................................. | 161/36 X |
| 3,391,511 | 7/1968 | Harris et al....................... | 161/69 X |
| 3,558,394 | 1/1971 | Marby............................... | 161/68 X |
| 3,642,566 | 2/1972 | Figge ............................... | 161/127 X |

Primary Examiner—George F. Lesmes
Assistant Examiner—Henry F. Epstein
Attorney, Agent, or Firm—Stanley G. Ade

[57] ABSTRACT

A three dimensional inner shear form is stamped or formed from any desired material and consists of a plurality of three sided half cubes interconnected together by the bases thereof. The apices of the half cubes are flattened and may be apertured for weight purposes. Inner or outer skins may be adhesively secured across the flattened apices to form a panel structure having considerable strength and which can be planar or can be formed into spherical, circular or warped forms. Adjacent sections of the shear form can be joined by elongated connectors which are secured along mating edges of sections, the connection being formed by an elongated strip of shear form which fits over the angles and planes of the adjacent edges of the adjacent sections.

8 Claims, 5 Drawing Figures

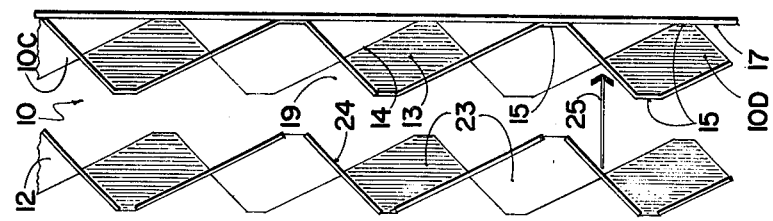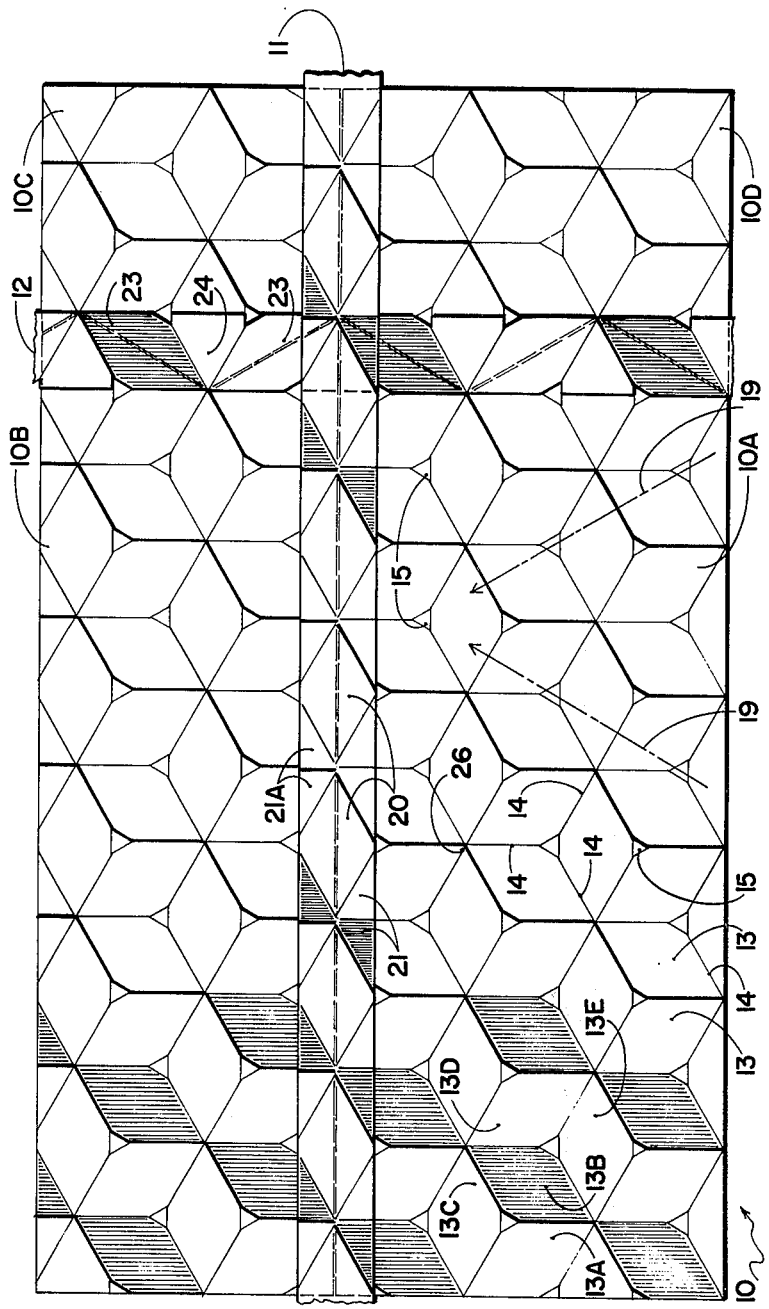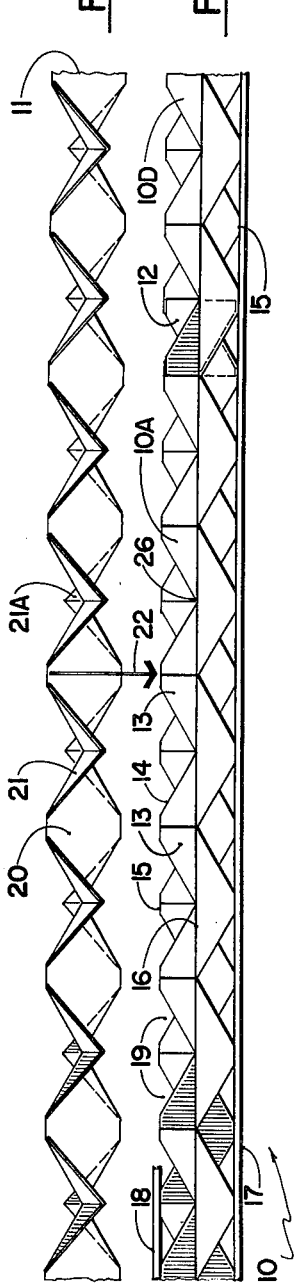

3,914,486

SHEAR FORM STRUCTURES

BACKGROUND OF THE INVENTION

This invention relates to new and useful improvements in shear form structures which heretofore have been basically of a honeycomb section. Such sections are difficult to manufacture and furthermore are extremely difficult to form in anything but planar panels.

SUMMARY OF THE INVENTION

The present invention overcomes these disadvantages by providing a shear form core which can be stamped or otherwise formed from any desired material whether it be wood, metal, plastic, stone, glassfiber, concrete or the like.

Another object of the invention is to provide a device of the character herewithin described which inner and/or outer stress skins may be secured to the shear form core to act as top and bottom plates under which circumstances the faces of the inner core member act to distribute the shear allowing the top and bottom plates to act with it in resisting bending forces.

The top and bottom plates or surfaces can be either flat or shaped to carry direct stresses or may be of the same configuration as the overall structure so that they can be used in bending between the points of support and the apex.

Another object of the invention is to provide a structure of the character herewithin described in which the inner shear structure or core may be bent into spherical, circular or warped forms, depending, of course, on the thickness of material in this shear portion of the structure. The inner shear structure can be tapered so that it may be used in varying dimensioned cantilever formations. Furthermore the outer faces or panels on Both sides can be likewise bent or stiffened or made up of tension materials and can, if desired, be stressed.

Another object of the invention is to provide a structure of the character herewithin described in which the shear formed core configuration divides the space between the outer skins in two parts or pluralities of channels which may be used as plenums, duct space for electrical or other purposes or may be filled with insulation.

A still further object of the invention is to provide a structure of the character herewithin described which includes a novel connection between adjacent panels or core sections which nests upon the adjacent sides of the sections being joined.

Another object of the invention is to provide a shear form core which is readily stacked for shipping thus reducing the bulk, it being understood that assembly can be made at the site or at the factory near the site. Furthermore, such assembly can either be with adhesives or by mechanical fastening means.

A still further object of the invention is to provide a device of the character herewithin described which is simple in construction, economical in manufacture, and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is a top plan view of the shear core showing a longitudinal and transverse junction between adjacent sections.

FIG. 2 is a side elevation of the transverse connector shown in FIG. 1.

FIG. 3 is an end view of FIG. 1 with a lower skin attached thereto.

FIG. 4 is a side elevation of the longitudinal connector shown in FIG. 1.

FIG. 5 is a side elevation of FIG. 1 showing a lower skin attached thereto.

In the drawings like characters of reference indicate corresponding parts in the different figures.

DETAILED DESCRIPTION

Proceeding therefore to describe the invention in detail, FIG. 1 is a top plan view showing a three dimensional shear core collectively designated 10. In this particular view, four sections of core are shown adjacently connected together, said sections being identified by reference character 10A, 10B, 10C and 10D.

A longitudinally extending connector collectively designated 11 connects the sections together longitudinally with reference to the drawings and a transversely extending connector 12 connects the sections together transversely with respect to the drawings. If the connectors are both on the same side of the sections as illustrated, then one of them must be discontinuous at the intersection of the connectors.

The central core section is either stamped, rolled or pressed from any desired material into a formation which consists of a plurality of three sided half cubes 13 connected together by the base edges 14 thereof so that the apices 15 of alternate half cubes lie alternately one upon each side of a central plane indicated by reference character 16, it being understood, of course, that the half cubes are hollow or open based. The faces of the cubes may be planar, shaped for greater strength or perforated to reduce weight or a combination of these.

The resultant structure is extremely strong and has high shear resistant characteristics.

If desired, upper or lower skins or both may be secured across the apices 15 of the half cubes and in the embodiment shown in FIGS. 1 and 3, a lower skin 17 is shown. In this connection, the apices 15 are flattened or cut off as illustrated in the drawings.

If desired, an upper skin 18 shown fragmentarily in FIG. 5 may also be secured to the flattened apices 15 of the half cubes above the center plane 16 in a manner similar to the lower skin or panel 17.

When one or more skins is provided, a plurality of space and parallel triangular channels on diagonals indicated by arrows 19, is defined between the skin and the surfaces of the half cubes on the side of the central plane 16 upon which the skin is secured, said channels being interconnected and being usable for the routing of conduits or the like as a plenum for air flow or for insulation as desired.

The aforementioned longitudinally extending connector strip 11 is shown in plan in FIG. 1 and in side elevation in FIG. 4 and it consists of a section of the core cut so that it nests upon the adjacent edges of the sections 10A and 10B, 10D and 10C.

In this embodiment, the connector 11 consists of a plurality of plates 20 similar in configuration to the sides 13 of the sections being joined and in this embodiment these plates are hexagonal when viewed in side elevation.

Adjacent plates 20 are connected together in this embodiment, by reverse angulated gussets 21 and 21A extending one upon each side of the junction between adjacent plates and adapted to nest within and over the angles formed by the sides of the sections 10A and 10B being joined so that when the connector strip is in position as shown in FIG. 1 and as indicated by arrow 22 between FIGS. 4 and 5, the connector strip nests over the adjacent edges of the section and may be secured thereto either by mechanical means or adhesive as desired.

The transversely extending connector 12 is also formed from a section having a configuration similar to the adjacent joining edges of the sections 10A and 10D, 10B and 10C and it also consists of a plurality of plates 23 connected together by a single angulated gusset 24 with alternate plates being situated in zig zag configuration and alternate gussets lying upon one side or the other of the junction between the sections.

Here again this connector strip nests over the sides and angles of the edges of the sections being joined as indicated by arrow 25 between FIGS. 2 and 3.

In both connector strips the gussets may be reduced or omitted, e.g. in larger structures to reduce weight. While the shear form can be joined at many different sections these straight cuts, as illustrated, appear most satisfactory. The connector width each side of the joint need only be wide enough to transfer transmitted forces.

In order to further clarify the structure of the half cubes reference should be made to FIG. 1 in which 13A, 13B and 13C are the three sides of one half cube whose apex is situated above the central plane 16 and joined to sides 13D and 13E of the next adjacent half cube whose apex is situated below the central plane 16, side 13B being common to both cubes with the first cube being hollow on the underside and the second half cube being hollow on the upper side.

The skins 17 and 18 can be joined either by butt joining or by lap joining allowing the lapping pieces to come together on the apices 15 whereupon they be secured thereto either by adhesive or by mechanical means thus allowing a join to be made practically at any point in the skin. Where the cut is parallel to one of the facets or sides of the cube, this face can be interlocked with the corresponding faces of the next panel if desired.

This shear form structure has a wide variety of uses in building construction, boat construction, aircraft, pressure vessels, pipe construction, heat stressing units, filtration, settling velocity reduction (liquids or gases) and the like.

It is also possible to build a continuous structure form varying the materials in such a structure such as for example, a plastic wall with glass windows or a wood construction with plastic openings. The inner core construction is also adapted for use in paper construction such as replacement of corrugation or conventional honeycomb inner cores.

The joining of the skins 17 and 18 to the inner shear form core 10 can be made resilient in order to reduce sound transfer through the material and also to reduce heat transfer through the material. Another aspect of the construction is the possibility of use in the construction of a conveyor belt which could be made with the inner shear core of steel and the outer skins of material such as rubber, such a construction of conveyor belt having very high strength characteristics.

One of the advantages of this inner core structure is that the moment resistance of it is limited to the moment capacity of the thickness of the material at the neutral surface.

As mentioned previously the material forming the inner shear core 10 can be made by pressing or by casting or can be made by pressing the material sheet to be formed between two plates with pegs set on a 60° grid, the grids on the plates being opposite, the pegs being located at the center of the triangles.

Cloth and fabric could be so moulded to form a stiffer insulating material for cloths or bedding and the intersection 26 between the sides lying on the central plane 16 can be weakened by removing a small section or changing the material at this point to reduce the stiffness. Alternatively, this intersection may be strengthened to stiffen the total structure.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A shear form structure comprising a three dimensional core formed from a plurality of hollow, three-sided, half cubes interconnected together along base edges thereof, with alternative apices being perpendicular to and on opposite sides of the central plane of said structure, said apices being flattened to form frustums.

2. The structure according to claim 1 which includes at least one planar skin secured across said apices to enclose at least one side of said core thereby defining a plurality of diagonally extending channels between said skin and said core.

3. The structure according to claim 1 which includes a connector strip for securing adjacent sections of core together said connector strip having a dimensional configuration the same as the configuration of the adjacent edges of the section of core being joined whereby said strip nests upon and engages said adjacent edges, and means to secure said strip to said adjacent edges.

4. The structure according to claim 2 which includes a connector strip for securing adjacent sections of core together, said connector strip having a dimensional configuration the same as the configuration of the adjacent edges of the section of core being joined whereby said strip nests upon and engages said adjacent edges, and means to secure said strip to said adjacent edges.

5. The structure according to claim 3 in which said connector strip comprises a plurality of plates having a configuration similar to the configuration of one of the sides of said half cubes, and reverse angulated gusset portions connecting said plates together, said gusset portions having a configuration similar to the configuration of the adjacent sides of the adjacent half cubes being connected together.

6. The structure according to claim 4 in which said connector strip comprises a plurality of plates having a configuration similar to the configuration of one of the sides of said half cubes, and reverse angulated gusset portions connecting said plates together, said gusset portions having a configuration similar to the configuration of the adjacent sides of the adjacent half cubes being connected together, said plates being hexagonal when viewed in elevation to conform to the truncated configuration of said sides.

7. The structure according to claim 3 in which said connector comprises a plurality of plates situated in zig zag relationship one with the other, and an angulated gusset plate connecting said first plates together, said first plates engaging the adjacent sides of said sections lying in alternate planes, said gusset plate engaging alternate sides of the adjacent sections lying at an angle to the adjacent sides.

8. The structure according to claim 4 in which said connector comprises a plurality of plates situated in zig zag relationship one with the other, and an angulated gusset plate connecting said first plates together, said first plates engaging the adjacent sides of said sections lying in alternate planes, said gusset plate engaging alternate sides of the adjacent sections lying at an angle to the adjacent sides.

* * * * *